Nov. 3, 1964   P. P. D. GAUSSENS ETAL   3,155,817
ELECTRIC SUPPLY SUPERVISION
Filed Nov. 16, 1959   2 Sheets-Sheet 1

INVENTORS:
P.P.D. GAUSSENS &
P. CAZALET
BY: Moore & Hall
ATTORNEYS.

United States Patent Office 3,155,817
Patented Nov. 3, 1964

3,155,817
ELECTRIC SUPPLY SUPERVISION
Pierre Paul Daniel Gaussens, 4 bis Blvd. des Granges, Sceaux, France, and Paul Cazalet, 85 Rue Pixercourt, Paris, France
Filed Nov. 16, 1959, Ser. No. 853,305
Claims priority, application France, Nov. 18, 1958, 779,391
6 Claims. (Cl. 235—151)

It is important alike to consumers and suppliers that the voltage of an electric supply system shall be carefully controlled; it should preferably not vary by more than a small percentage of its nominal value. Both parties are also concerned with the mean square voltage which determines the rate at which energy is supplied to the system.

Supervision of the supply is most sensitively maintained by constant measurement of the difference between the instant mean voltage of the system and its nominal value, with a view to integrating over any desired period both the ratio of the deviation to the nominal voltage, and the square of that ratio; that is to say the supervisor ascertains the values of $$\frac{\int_0^T \frac{V-V_o}{V_o} dt}{T} \text{ and } \frac{\int_0^T \left(\frac{V-V_o}{V_o}\right)^2 dt}{T}$$

where

V is the instantaneous voltage
Vo the nominal or reference voltage and
T the period over which integration has extended.

Such integration can only be attemped with mathematical exactness by computers of the analogue type, which lack precision and reliability and give rise to errors which it is difficult to evaluate.

It is a principal object of the present invention to make possible the supervision of the transmission and distribution of electrical energy by the aid of means of the digital type comprising an analog-to-digital converter and counters; for such means are much simpler and operate more reliably and with greater precision than analogue computers.

To this end the invention employs a measuring instrument equipped with means by which its indications may be read at preferably equal intervals of time to a predetermined degree of accuracy. In other words the means by which the instrument is read selects from a series of voltage values forming an arithmetic progression, that which is nearest the difference between the instantaneous voltage of the network and the nominal or reference voltage. The successive approximate deviations so ascertained are transmitted to means to add them algebraically, to calculate and add together the squares of these successive approximate deviations, and to record the number of successive measurements by which the algebraic sum of the approximate deviations and the sum of their squares must be divided to obtain the approximate mean values of the deviations and of their squares.

A further object of the invention is to provide an apparatus for deriving from the measured voltage of an electric supply system, digital values or numbers, with which it is very easy to compute the mean and/or means square values of the percentage of deviation of said measured voltage from a nominal voltage.

If $$v = \frac{V-V_o}{V_o}$$

be the percentage value of the instantaneous deviation of the network voltage V from the fixed reference voltage Vo, then while an analogue computer would theoretically effect an exact integration of the successive instantaneous values of $v$ and of $v^2$, which are respectively measured and calculated continuously, the apparatus of the present invention effects the exact summation of values approximating to $v$ and $v^2$ obtained by measurement of $v$ at preferably regularly spaced times; or, more precisely, the means of measurement of the apparatus measures periodically the value of $v$, and simultaneously selects from among a definite series of values $v_i$ forming an arithmetic progression, that which is nearest to the measured value of $v$; suitable means comprising counters adds the successive values of $v_i$ so determined, calculates and adds their squares, and records the number $n$ of successive measurements; when an adequate number N, of measurements has been made the quotients $$\left[\sum_1^N v_i\right]/N \text{ and } \left[\sum_1^N (v_i)^2\right]/N$$

give values very close to the mean values of the deviations $v$ and of their squares.

The systematic errors affecting these approximate values plainly depend only on the choice of the frequency of successive measurements of $v$ and on the common difference of the arithmetic progression formed by the values $v_i$; so these errors can readily be evaluated, and can be made small by choosing a high frequency of measurement (say, one measurement per minute) and a small common difference (say less than 1% of the nominal voltage).

The substitution of values $v_i$ chosen from a definite series for the values $v$ actually measured can much simplify the construction of that part of the apparatus intended to calculate the successive values of $v^2$ as well.

While it suffices for many purposes to integrate the voltage deviation and its square with respect to time, for which purposes the apparatus of the invention provides for reading a voltmeter at regularly spaced times, it may also be of interest to know how the voltage varies with load. For that purpose the voltmeter needs to be read whenever a given amount of energy has passed into the system since the last reading. The invention provides for this use of the apparatus by employing a watthourmeter instead of a clock to determine the times at which the voltmeter is read.

There is described below and shown diagrammatically in the drawing annexed, one construction of apparatus according to the invention.

Figure 3:
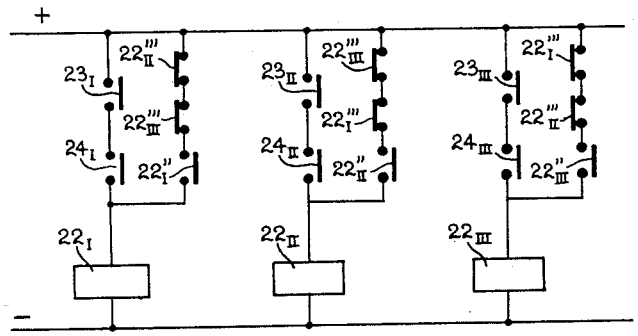
Figure 3:
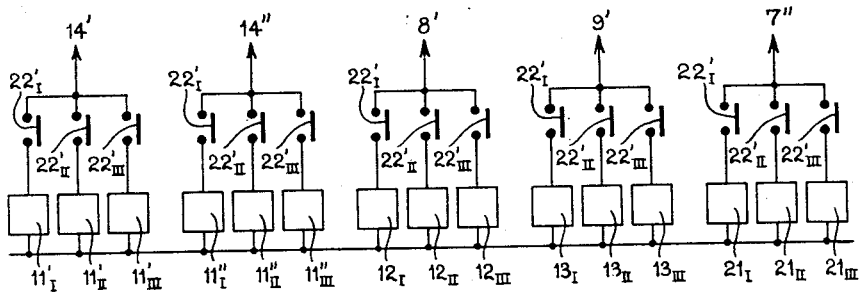

FIGURES 3 and 3' are diagrams of connections of two distinct parts of an auxiliary apparatus which makes it possible to determine the mean and mean square of the deviations of network voltage during three distinct periods of the day.

Figure 4:
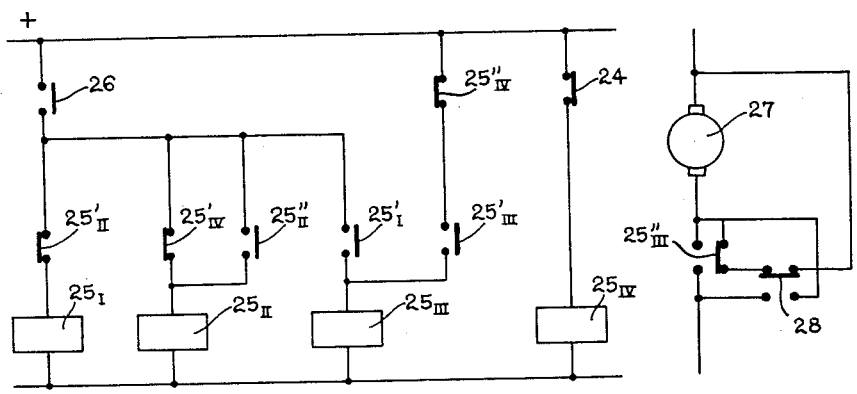

FIGURES 4 and 4' are diagrams of connections of two distinct parts of another auxiliary apparatus designed to control the means of measurement so that successive measurements are made at irregular intervals of time, such that the same amount of energy has been sent into the network during each of them.

Figure 1:
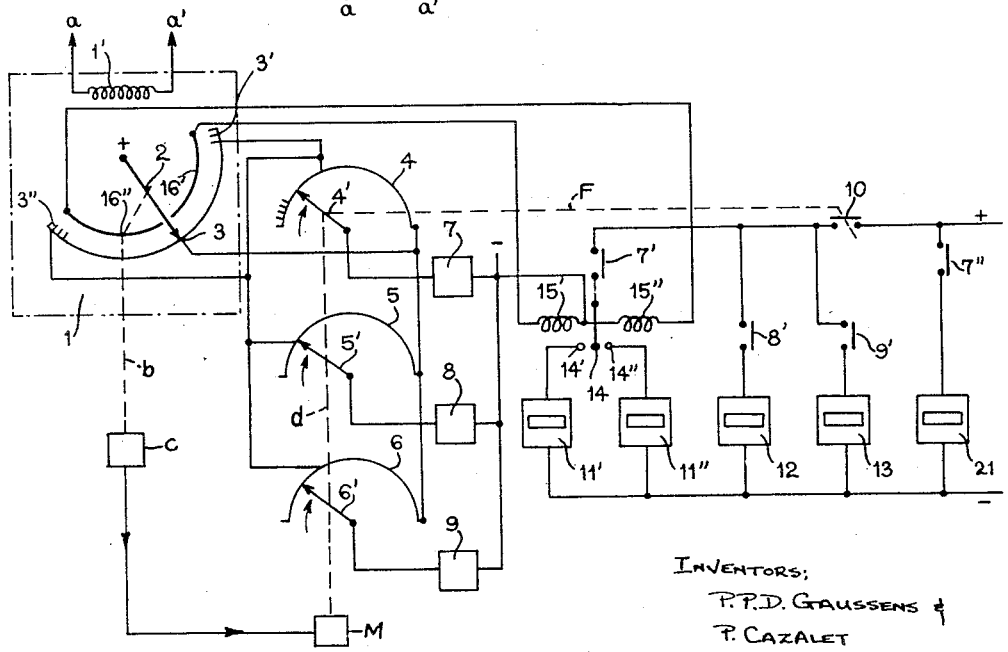
FIGURE 1 is a diagram of connections of the means of measurement, of the analog-to-digital converter, and of the counters.

The means of measurement 1, shown diagrammatically in FIG. 1, is a voltmeter of the following special type: adapted for analog-to-digital conversion; its winding 1' is supplied from the voltage of the network under study. Its pointer 2 swings above 2 $M+1$ (M being integral) insulated contact plates 3, 3', 3'' so arranged that the pointer 2 is vertically above the middle plate 3 when the voltage V of the network is equal to the chosen reference voltage Vo, and is vertically above the $m$th plate to right or left of the middle plate 3 when $$V = Vo \pm m\left(\frac{\Delta V}{M}\right)$$

that is to say when the deviation $$v = \frac{V - Vo}{Vo}$$

is an integral multiple of the maximum value $\Delta V$ which the instrument can register of the deviation $V - Vo$ divided by $MVo$. In other words $$\frac{\Delta V}{M}$$

is the change of voltage needed to move the pointer from the middle of one contact plate to the middle of the next.

Under the control of a clock or synchronous commutator C, as schematically indicated by the dash line $b$, the pointer 2 is caused to descend axially upon the insulated plates 3, 3', 3'' at times, in general at regularly spaced times, for example every minute, means being provided to ensure that it makes contact with the nearest of the 2 $M+1$ plates, so closing a circuit hereinafter described.

For example, if the reference voltage is $Vo = 100$ volts and the maximum measurable amplitude of deviation $\Delta V = 25$ volts (75 volts $\leq V \leq$ 125 volts) a voltmeter of the type described having $M = 50$ contact plates to right and left of the middle plate corresponding to 100 volts, will determine in each successive measurement a value approximating to the relevant variation $v$, say $$v_i = m\frac{\Delta V}{MVo} = m\frac{25}{50 \times 100} = \frac{m}{200}$$

which is subject to a systematic error of not more than ½%.

The analog-to-digital converter comprises further a rotary switch such as used in telephone exchanges having three banks 4, 5, 6 each of $M+1$ contacts, and the wipers of the switch are actuated together by a motor M, as schematically indicated by the dash line $d$, so as to make one complete revolution together in the direction of the arrow (from left to right) at each of the regularly spaced times when the pointer 2 of the measuring instrument is brought into contact with the plate nearest to it under the control of the clock C, as schematically indicated by the line $e$, which connects said clock C with the motor M of the rotary switch.

The middle plate 3 of the measuring instrument 1 is connected to the right hand zero contact of each bank of the switch, while each of its M pairs of plates 3', 3'', symmetrically placed with respect to the middle plate 3, and of rank $m$ to right or left of the middle plate is connected in common:

First to the contact of the first bank 4 of rank $m$ from the zero contact;

Second to the contact of the second bank 5, of ordinal number $q$ from the zero contact of this bank, $q$ being the integer next below the value of $$\frac{m^2}{M}$$

which is generally not equal to an integer;

Third to the plate of the third bank 6 of rank $(m^2 - Mq)$ from the zero contact of this bank.

The following table shows the respective values of $m$, $q$, $r = (m^2 - Mq)$, and $m^2$ in the case where each bank of the rotary switch comprises $M+1 = 51$ contacts ($M = 50$):

| 1 | 2 | 3 | 4 | 1 | 2 | 3 | 4 |
|---|---|---|---|---|---|---|---|
| m | q | r=m²−50q | m² | m | q | r=m²−50q | m² |
| 1 | 0 | 1 | 1 | 26 | 13 | 26 | 676 |
| 2 | 0 | 4 | 4 | 27 | 14 | 29 | 729 |
| 3 | 0 | 9 | 9 | 28 | 15 | 34 | 784 |
| 4 | 0 | 16 | 16 | 29 | 16 | 41 | 841 |
| 5 | 0 | 25 | 25 | 30 | 18 | 0 | 900 |
| 6 | 0 | 36 | 36 | 31 | 19 | 11 | 961 |
| 7 | 0 | 49 | 49 | 32 | 20 | 24 | 1024 |
| 8 | 1 | 14 | 64 | 33 | 21 | 39 | 1089 |
| 9 | 1 | 31 | 81 | 34 | 23 | 6 | 1156 |
| 10 | 2 | 0 | 100 | 35 | 24 | 25 | 1225 |
| 11 | 2 | 21 | 121 | 36 | 25 | 46 | 1296 |
| 12 | 2 | 44 | 144 | 37 | 27 | 19 | 1369 |
| 13 | 3 | 19 | 169 | 38 | 28 | 44 | 1444 |
| 14 | 3 | 46 | 196 | 39 | 30 | 21 | 1521 |
| 15 | 4 | 25 | 225 | 40 | 32 | 0 | 1600 |
| 16 | 5 | 6 | 256 | 41 | 33 | 31 | 1681 |
| 17 | 5 | 39 | 289 | 42 | 35 | 14 | 1764 |
| 18 | 6 | 24 | 324 | 43 | 36 | 49 | 1849 |
| 19 | 7 | 11 | 361 | 44 | 38 | 36 | 1936 |
| 20 | 8 | 0 | 400 | 45 | 40 | 25 | 2025 |
| 21 | 8 | 41 | 441 | 46 | 42 | 16 | 2116 |
| 22 | 9 | 34 | 484 | 47 | 44 | 9 | 2209 |
| 23 | 10 | 29 | 529 | 48 | 46 | 4 | 2304 |
| 24 | 11 | 26 | 576 | 49 | 48 | 1 | 2401 |
| 25 | 12 | 25 | 625 | 50 | 50 | 0 | 2500 |

It is easy to ascertain that the sum obtained by adding the product by 50 of the number in column 2 on any line of the above table, to the number in column 3 on the same line thereof, is equal to the number in column 4 also on the same line, whereby $q \times M + r = m^2$, $q$ and $r$ being integers inferior or equal to the maximum value of the integer $m$, which is $M = 50$ in this example.

The windings 7, 8, 9 of three coupling relays are connected in series with the wipers 4', 5' and 6' of the rotary switch, and with one pole of a source of electrical energy, the other pole of which is connected to the pointer 2 of the measuring instrument 1. So when the pointer of the voltmeter 1 makes contact with a plate 3' or 3'' of ordinal number $m$ counting from the middle plate 3 the exciting circuits of the relays 7, 8 and 9 are closed when the wipers 4', 5' and 6' while sweeping their respective banks from left to right on FIG. 1, reach the respective contacts of ordinal numbers $m$, $q$ and $(m^2 - Mq)$ of the banks 4, 5 and 6, reckoning from their right hand zero contacts and said relays are adapted to remain closed at least until the wipers have ended their complete revolution and reached the respective right hand zero contacts.

The analog-to-digital converter comprises also means for producing a pulse of current each time the rotary switch steps from contact to contact. This may be an electric pulse generator synchronised with the sweep of the wiper 4' over the several contacts of the first bank 4 of the switch. Such a generator consists essentially of a source of D.C. voltage having one pole connected to a contact 10 of an interrupter, the interrupter being synchronised by well known means with the common shaft of the switch wipers, as schematically indicated by the dash line $f$, so that the contact 10 is closed each time the wiper 4' comes upon a contact of the bank 4.

At each closing of contact 10 the voltage of the source is applied to electric pulse counters 11' and 11'', 12 and 13 connected in parallel with each other, when the respective contacts 7', 8', 9' of the coupling relays 7, 8, 9 have been closed. The electric pulse counters 11', 11'', 12 and 13 may be constructed as disclosed in the Pudelko et al. U.S. Patent No. 2,781,975, dated February 19, 1957.

During each successive measurement made by the instrument 1, while its pointer 2 is in contact with, say, the $m$th insulated plate, the counter $11'$ or $11''$ receives precisely $m$ pulses through the relay contact $7'$, which remains closed while the wiper $4'$ moves from the $m$th contact of the first bank 4 to its right hand zero contact. So at any instant the total number of pulses recorded by the counter $11'$ or $11''$ is proportional to the sum of the approximate deviations $v_i$ determined by preceding measurements, since each of these approximate deviations is proportional to the ordinal number of the contact plate touched by the pointer 2, as it was previously indicated.

The counters 12 and 13 likewise receive, during each successive measurement, a number of pulses equal respectively, to $q$ (the whole number next below $$\frac{m^2}{M})$$

and to $r = (m^2 - Mq)$. As $r + q \times M = m^2$, the sum of the total registered by 13 and of $M$ times the total registered by 12 is proportional at any instant to the sum of the squares of the approximate variations $v_i$ determined in preceding measurements since $v_i^2$ is proportional to $m^2$. The number $N$ of successive measurements already made prior to a given instant is registered by a counter 21 which is connected to the source of D.-C. voltage through the contact $7''$ of relay 7 at each measurement carried out by the measuring instrument 1. It will be seen from the above description that the approximate values $$\left[\sum_1^N v_i\right]/N \text{ and } \left[\sum_1^N (v_i)^2\right]/N$$

of respectively the mean and mean square ratio of deviation of the system voltage to the nominal voltage at a given instant can be easily derived from the readings at said given instant of the counters $11'$, $11''$, 12, 13 and 21.

The embodiment shown in FIG. 1 includes further means to take account of the sign of the variation $v$ and of its approximate value $v_i$, so that the algebraic sum $$\sum_1^N v_i$$

may be arrived at. For that purpose the change-over contacts 14, $14'$, $14''$ of a polarised relay $15'$ $15''$ are connected in series with the contact $7'$ of relay 7 to direct the pulses transmitted through 10 either to the counter $11'$ alone or to the counter $11''$ alone according as the pointer 2 of instrument 1 is to right or left of the middle contact plate 3. The two windings $15'$, $15''$ of this polarised relay have therefor independent exciting circuits, of which only one is closed according as the pointer 2 of the measuring instrument 1 is to right or left of the middle contact plate 3. In the construction shown each exciting circuit extends through the pointer 2 and a conductive segment $16'$ or $16''$, these segments reaching from near the zero position of the pointer the one to the left and the other to the right respectively up to the left and right end positions of said pointer. So each time the pointer 2 descends it contacts with only one of said segments $16'$ and $16''$ according as the pointer is deflected to left or right that is, according as the deviation $v$ is negative or positive. The totals recorded by the independent counters $11'$ and $11''$ are therefore respectively proportional at any instant to the sums of the positive and negative approximate deviations $v_i$ respectively determined in preceding measurements, while their difference is proportional to the algebraic sum of the deviations $$\sum_1^N v_i$$

To adapt the apparatus for use on networks of different nominal voltages (for example, 100, 127, 220, 380 volts and so forth) the network voltage is applied to the winding of the voltmeter through a reducer of variable ratio designed to provide a precise reference voltage, say of 100 volts, when it receives from the mains a voltage exactly equal to the nominal value that the mains voltage should have.

Figure 2:
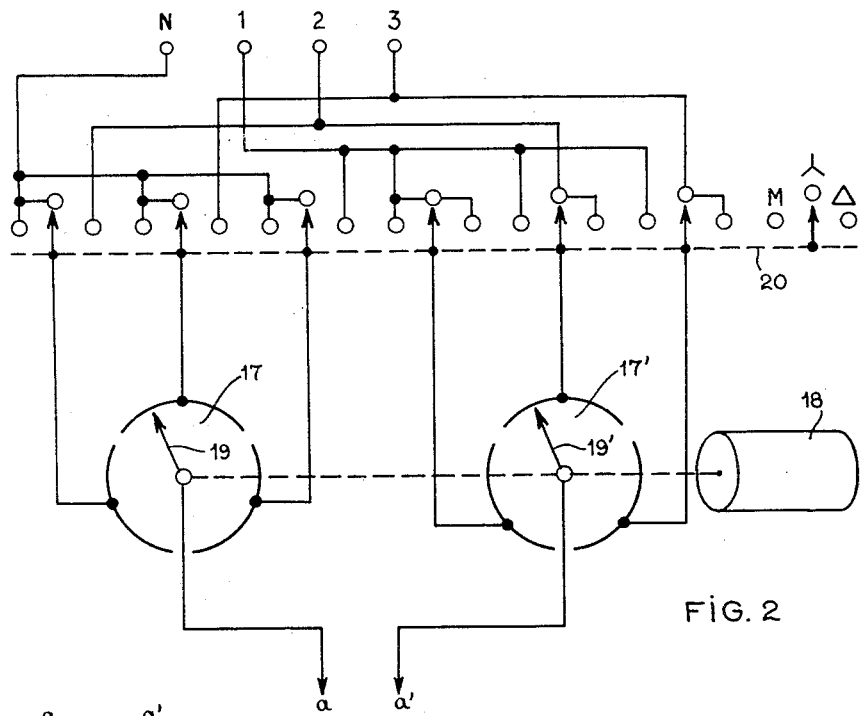
FIGURE 2 is a diagram of the circuit feeding the apparatus of FIG. 1 including a synchronous commutator.

In the case of a three-phase system an improvement in the apparatus above described enables it to make successive measurements upon the three simple or composite voltages, in succession in circular order; for that purpose the four poles of the three-phase system are connected to the terminals N, 1, 2, 3, of the intermediate circuit shown in FIG. 2, which comprises a three-segment double commutator 17, $17'$ upon a shaft rotated continuously by the synchronous motor 18. The voltage taken from the brushes 19, $19'$ is applied to the measuring instrument 1, if necessary through an appropriate potentiometer or other reducer. A manually operated three-position switch 20 makes it possible to apply the apparatus to measurement of the first simple voltage (position M) alone, or alternatively to measurement of either the three simple voltages (star connection) or three composite voltages (mesh connection) in succession.

The apparatus described may also be equipped with auxiliary means for determining the mean and mean square values of the deviations of voltage of the network during three distinct periods of the day.

This auxiliary means, the connections of which are shown in FIGS. 3 and $3'$, comprises five groups each of three counters, $11'_I$, $11'_{II}$, $11'_{III}$ ... $13_I$, $13_{II}$, $13_{III}$, $21_I$, $21_{II}$, $21_{III}$. Each counter of each of the first four groups is intended to play the part of the counter $11'$, $11''$, 12 or 13 of the principal apparatus shown in FIG. 1 for one of the three distinct periods of measurement. The three counters $21_I$ to $21_{III}$ of the fifth group are intended respectively to total the number of successive measurements during each period.

The auxiliary means comprises also three relays each of which has its winding $22_I$, $22_{II}$ or $22_{III}$ connected to the terminals of a source of voltage through two parallel circuits, namely:

First, an exciting circuit, made by the connection in series of a timing contact $23_I$, $23_{II}$ or $23_{III}$, which is closed throughout the corresponding period of measurement, and a contact $24_I$, $24_{II}$, or $24_{III}$, which is closed momentarily at the end of each complete revolution of the rotary switch, preferably under the control of the clock or synchronous commutator controlling the measuring instrument of the principal apparatus;

Second, a holding circuit made up by the connection in series of a working contact $22''_I$, $22''_{II}$ or $22''_{III}$ of the relay itself $22_I$, $22_{II}$ or $22_{III}$, and a resting contact of each of the other two relays (for example $22'''_{II}$ and $22'''_{III}$ for $22_I$).

Each of the three counters of the five groups is connected through a working contact $22'_I$, $22'_{II}$ or $22'_{III}$ of the homologous relay $22_I$, $22_{II}$, or $22_{III}$ respectively, for the counters of the first group to contact $14'$ of the principal apparatus, for those of the second group to contact $14''$, for those of the third to contact $8'$, for those of the fourth to contact $9'$ and for those of the fifth group to contact 7.

This auxiliary means works as follows.

During one period of measurement (for example period I) the corresponding relay ($22_I$) is excited through its holding circuit ($22''_I$, $22'''_{II}$, $22'''_{III}$), while the other two relays ($22_{II}$, $22_{III}$) are at rest; the homologous counter of each group ($11'_I$, $11''_I$, $12_I$, $13_I$, $21_I$) then totals the pulses which reach it from the principal apparatus during the whole of the period of measurement considered.

The instant of passing to the following period of measurement (II, for example) is marked by the opening of the timing contact previously closed ($23_I$) and the closing of the following timing contact ($23_{II}$). If a measurement is being made at this instant (contacts $24_I$, $24_{II}$ and $24_{III}$ being opened) the relay previously excited ($22_I$) remains excited through its holding circuit to allow the corresponding counters ($11'_I$ ... etc.) to record the result of the last measurement initiated during the preceding period. As soon as the measurement in train is finished, and the contacts $24_I$, $24_{II}$ and $24_{III}$ close momentarily, the relay corresponding to the new period of measurement ($22_{II}$) is excited through its normal circuit ($23_{II}$, $24_{II}$); it therefore interrupts the holding circuit of the relay ($22_I$) previously excited (by opening contact $22'''_{II}$); and its own holding circuit is closed (through the closing of $22''_{II}$ and $22'''_{I}$). The newly excited relay ($22_{II}$) will remain excited, notwithstanding the later opening of contacts $24_I$, $24_{II}$, $24_{III}$, throughout the corresponding period of measurement, so ensuring during this period the registering of pulses by the homologous counters ($11'_{II}$ ... and so on).

Finally the present invention provides auxiliary means for controlling the measuring instrument so that it makes measurements at irregular intervals, such that the same quantity of energy is passed through the network in each of them.

This auxiliary means, the connections of which are shown in FIG. 4, comprises four relays, the windings $25_I$, $25_{II}$, $25_{III}$ and $25_{IV}$ of which are connected to the terminals of a source of voltage through certain working and resting contacts connected in series and parallel as shown. The contacts are controlled by the relays themselves except:

(1) The contact 24, connected in series in the exciting circuit of relay $25_{IV}$ which is closed during the intervals between successive measurement, preferably by the clock or synchronous commutator of the principal apparatus;

(2) The contact 26, which is closed through a watt-hour-meter connected to the network each time the watt-hour-meter has measured the passage of a determined quantity of energy since contact 26 was last closed.

As FIGURE 4' shows, the supply circuit of the synchronous motor 27 which drives the commutator controlling the measuring instrument 1, also includes a working contact $25''_{III}$ of relay $25_{III}$, which can be short-circuited by the manually operated switch 28 when it is desired that the measuring instrument shall make measurements at regular intervals.

This auxiliary means works as follows.

The preceding cycle of calculation being finished, the motor 27 is at rest, closing contact 24. Relay $25_{IV}$ therefore has current flowing through it while relays $25_I$, $25_{II}$ and $25_{III}$ are at rest. When the watt-hour-meter closes contact 26 relay $25_I$ is excited. Through its contact $25'_I$ relay $25_{III}$ is excited, and this, at contact $25''_{III}$ puts the motor 27 in circuit. The motor starts, and by opening contact 24 de-energizes relay $25_{IV}$, which causes a holding circuit for relay $25_{III}$ to be closed through contacts $25'_{III}$ and $25''_{IV}$, and relay $25_{II}$ to be excited through contact $25'_{IV}$. The relay $25_{II}$ then closes a holding circuit at contact $25''_{II}$, and opens contact $25'_{II}$, de-energizing relay $25_I$.

When the measurement is ended, motor 27 re-closes contact 24; relay $25_{IV}$ being excited breaks the holding circuit of relay $25_{III}$ which releases and stops the motor. As initiation to a new cycle the contact 26 is opened by the watt-hour-meter, causing relay $25_{II}$ to release.

If the energy conveyed by the network should fail the watt-hour-meter may stop in such a position that it keeps the contact 26 closed. If this should happen the system described prevents the carrying out of more than one cycle of measurement.

We claim:

1. In an apparatus for deriving from the measured voltage of an electric supply system, numbers for easily computing therewith the mean and mean square values of the percentage of deviation of said measured voltage from a nominal voltage, the combination of a voltmeter connected to measure the deviation of the voltage of the system from said nominal voltage, a row of contact plates associated with said voltmeter, a source of current, and means operating at regular spaced times to connect said source of current to a selected one of said contact plates the selection being dependent on the instantaneous voltage applied to the voltmeter, with a rotary selector switch having banks of contacts connected with said contact plates and rotary wipers adapted to sweep synchronously the whole banks during each of the spaced times at which said source of current is connected to one of said contact plates, a pulse generator adapted to supply a pulse of current at each step of the switch wipers, at least one counter for each bank of the switch, a relay associated with each wiper, said relay being excited upon the wiper sweeping a contact rendered live through its connection to the contact plate to which the source of current is connected and operating to connect the pulse generator with the corresponding counter during the remainder of the full sweep of the wipers, and a counter for counting how many times the source of current is connected with one of the contact plates.

2. Apparatus according to claim 1 including in addition switching means for connecting said voltmeter to one phase of a three-phase supply system, and alternatively in turn to each of the three phases.

3. Apparatus according to claim 1 having a plurality of counters for each bank of the switch, and in addition a time switch operating to connect the apparatus to the system for determined periods during a day, and for rendering the counters associated with each bank of the switch operative respectively in successive periods.

4. Apparatus according to claim 1 including also a watt-hour-meter and means operable thereby for reading said voltmeter at intervals during each of which a determined quantity of energy has been supplied to said system.

5. An apparatus for deriving from the measured voltage of an electric supply system, numbers for easily computing therewith the mean value of the percentage of deviation of said measured voltage from a nominal voltage, comprising in combination a center zero voltmeter having a pointer and connected to measure the algebraic difference between the voltage of the system and said nominal voltage, a row of contact studs including a center stud and disposed parallel and adjacent to the path of swing of said pointer, a counter and a clock device adapted to bring said pointer into contact with the nearest stud at regularly spaced times and to drive this counter a step further at each of said regularly spaced times, a rotary switch comprising at least one bank of contacts, and a wiper adapted to sweep this whole bank during each of said regularly spaced times under the control of said clock device, a lead connecting the center stud of the row of studs to the zero contact of the rotary switch, further connections between each pair of said studs of the same ordinal number reckoning from the center stud and a contact of the same ordinal number in the bank of the rotary switch, a coupling relay and a source of energizing current disposed to be connected together through said pointer of the voltmeter and said wiper of the rotary switch when said pointer is brought into contact with one of the studs, and said wiper sweeps the contact connected to said last stud, said coupling relay being adapted to remain thereafter energized during the remainder of the full sweep of the bank by the wiper, an electric pulse generator synchronized with the sweeping of the contacts by said wiper, two electric pulse counters, and switching means adapted to cooperate with said coupling relay to supply the electric pulses from said generator to either one of said last two counters according as the voltmeter pointer is on the right or left side of said center stud.

6. An apparatus for deriving from the measured voltage of an electric supply system, numbers for easily computing therewith the mean square value of the percentage of deviation of said measured voltage from a nominal voltage, comprising in combination a center zero voltmeter having a pointer and connected to measure the algebraic difference between the voltage of the system and said nominal voltage, a row of contact studs including a center stud and disposed parallel and adjacent to the path of swing of said pointer, a counter and a clock device adapted to bring said pointer into contact with the nearest stud at regularly spaced times and to drive this counter a step further at each of said regularly spaced times, a rotary switch comprising two banks of contacts and two wipers adapted to sweep synchronously these whole banks during each of said regularly spaced times under the control of said clock device, a lead connecting the center stud of the row of studs to the zero contact of each of said banks, further connections between each pair of said studs of the same ordinal number reckoning from the center stud and, first, a contact of the first bank of the switch of an ordinal number next below the square of the ordinal number of the pair of studs divided by the total number of pairs of studs, and, second, a contact of the second bank of the switch of an ordinal number equal to the difference between the square of the ordinal number of the pair of studs and the product of the total number of pairs of studs by the ordinal number of the contact of the first bank connected to the same pair of studs, a coupling relay associated with each bank of the rotary switch and a source of energizing current disposed to be connected together through said pointer of the voltmeter and the wiper of the bank with which the coupling relay is associated, when said pointer is brought into contact with one of the studs and said wiper sweeps the contact of the bank connected to said last stud, said coupling relays being adapted to remain thereafter energized during the remainder of the full synchronous sweep of the banks by the wipers, an electric pulse generator synchronized with the sweeping of the contacts by said wipers, and two electric pulse counters disposed so as to be each connected to said electric pulse generator by one of said coupling relays when it is energized.

References Cited in the file of this patent
UNITED STATES PATENTS

| | | |
|---|---|---|
| 1,744,840 | Strieby | Jan. 28, 1930 |
| 2,142,252 | Nunan | Jan. 3, 1939 |
| 2,393,186 | Potter | Jan. 15, 1946 |
| 2,888,671 | Bolie | May 26, 1959 |
| 2,912,163 | Van Tuyl | Nov. 10, 1959 |
| 2,936,447 | Kinkead et al. | May 10, 1960 |
| 2,949,232 | Spencer | Aug. 16, 1960 |

OTHER REFERENCES

"Meter-Type Analog-to-Digital Converter," Electronic Design, July 15, 1956, pages 36 and 37.